July 16, 1968   J. V. PENNINGTON   3,392,743
LUBRICATED BALL VALVE WITH FLEXIBLE METAL SEALING LIPS
Filed April 7, 1966   2 Sheets-Sheet 1
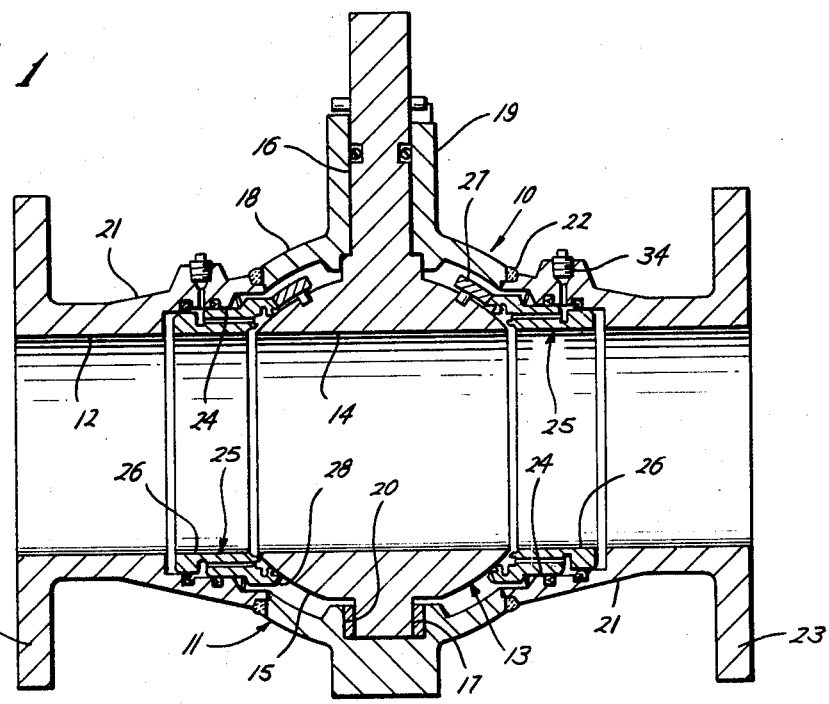
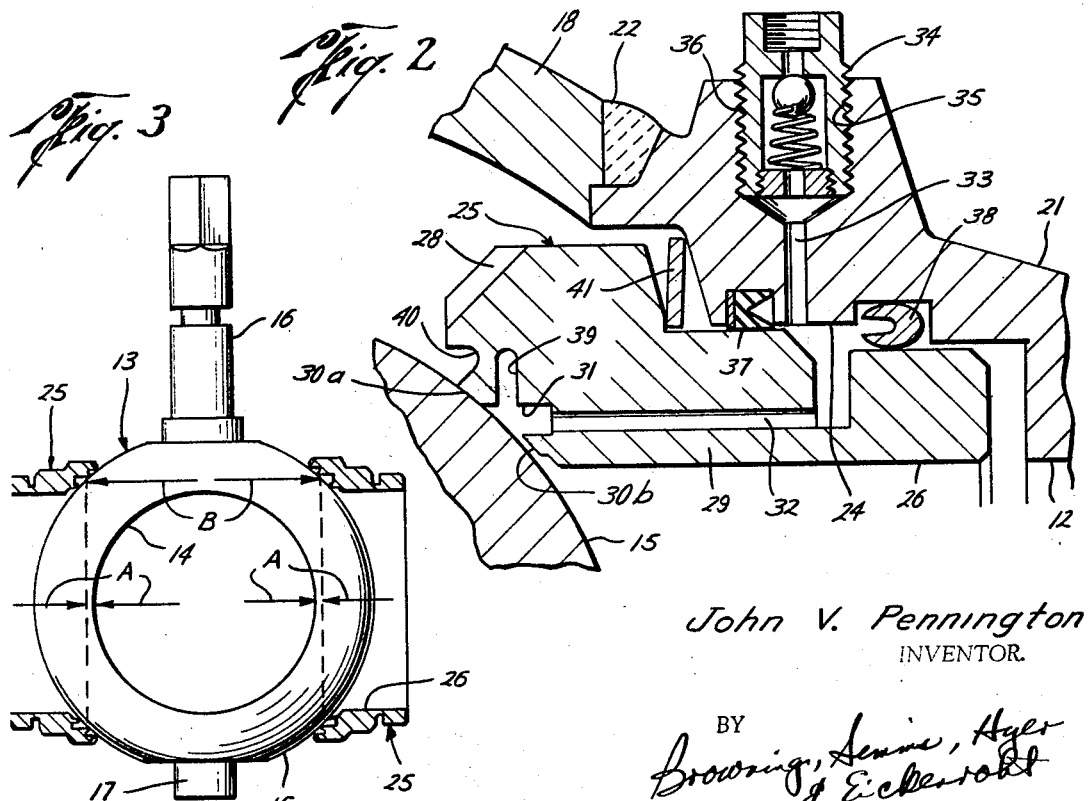
John V. Pennington
INVENTOR.
BY
ATTORNEYS July 16, 1968 J. V. PENNINGTON 3,392,743
LUBRICATED BALL VALVE WITH FLEXIBLE METAL SEALING LIPS
Filed April 7, 1966 2 Sheets-Sheet 2
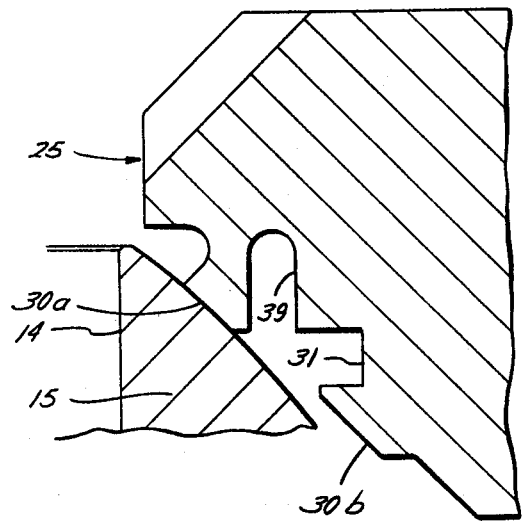
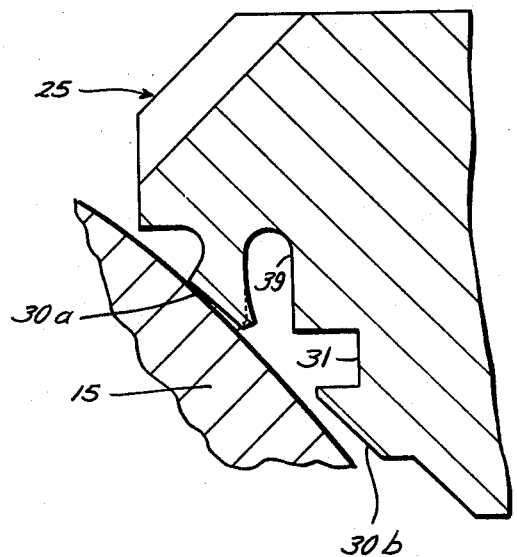
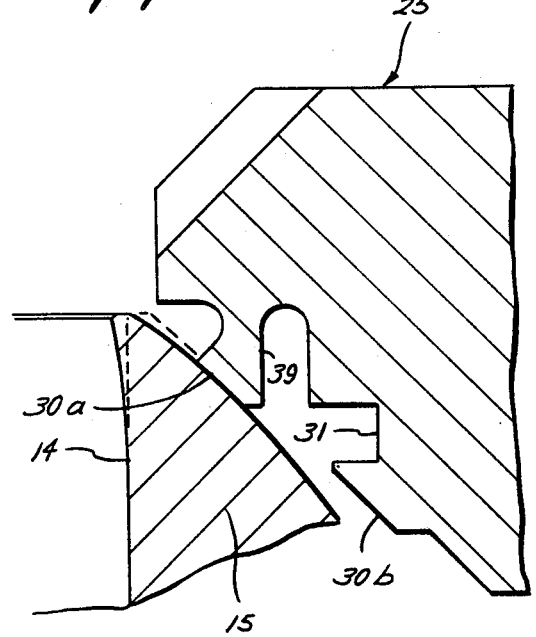
John V. Pennington
INVENTOR.
ATTORNEYS

United States Patent Office 3,392,743
Patented July 16, 1968

3,392,743
LUBRICATED BALL VALVE WITH FLEXIBLE
METAL SEALING LIPS
John V. Pennington, Houston, Tex., assignor to Cameron
Iron Works, Inc., Houston, Tex.
Filed Apr. 7, 1966, Ser. No. 540,899
4 Claims. (Cl. 137—246.22)

This invention relates generally to improvements in ball valves, preferably of the lubricated type.

In lubricated valves, a film of lubricant within a groove about the inner end of a metal valve seat seals between the seat and the valve member. Usually, the lubricant is fed to the groove through one or more passageways in the valve seat connecting with a passageway in the valve body to which a fitting is connected for supplying the lubricant through the passageways to the groove. The lubricant is contained within the groove by radially spaced apart lips on the inner end of the seat.

Difficulties have heretofore been encountered in establishing a metal-to-metal seal between the inner end of the seat and a ball-shaped valve member, especially when the flow opening through the valve member is relatively large with respect to its diameter. Thus, it has instead been proposed to form the outer lip from a ring of yieldable material, such as rubber or plastic, held in a slot in the inner end of the metal seat body. This ring protrudes from the seat body so as to seal against the valve member on the low pressure side of the groove. However, this has not proven entirely satisfactory, because, under high loads, the protruding end of such a ring may flow into the space between the end of the seat body and valve member. Also, when the rate of flow through the valve is high, the sealing face of the ring may be scored and, in fact, the entire ring may be blown out of the slot in the seat body.

In some cases, the seats in lubricated valves are so arranged that the lubricant is effective to force the inner end of the seat against the valve member. Thus, the pressure of the lubricant may be increased to urge the seat tighter against the valve member. However, the lubricant is often over-pressurized, so that it forces the seat so tightly against the valve member as to make it difficult to turn. In the event the lubricant is raised to a pressure considerably higher than the line pressure, it may distort or actually collapse the seat. Thus, there is a need for relieving the lubricant before this point is reached. One means of accomplishing this is shown in a copending application Ser. No. 354,962, filed Mar. 26, 1964, by John P. Oliver, and assigned to the assignee of the present application.

The primary object of this invention is to provide a ball valve having one or more seats of such construction as to seal with respect to the valve member, and, in the case of a lubricated valve, to contain such lubricant, even under high pressures and flow rates, and with ball constructions having large openings so as to provide maximum flow therethrough.

Another object is to provide such a ball valve in which the lubricant may be relieved, when necessary, and particularly in the manner disclosed in the aforementioned copending patent application.

It has been found that, especially under high pressures, a ball-shaped valve member will deflect unevenly. That is, with the opening through the ball disposed across or transversely of the seat, some portions thereof against which the seat engages are thinner than others and thus will deflect more than the other thicker portions. Furthermore, the amount which these thin portions deflect will increase as the diameter of the opening becomes larger relative to the diameter of the ball. With this in mind, and in accordance with the illustrated embodiment of the invention, I provide a ball valve in which the metal seat body has a pair of radially spaced apart metal lips on its inner end, one of these lips being relatively flexible and engageable with the ball-shaped valve member prior to engagement therewith of such other lip as the inner end of the seat is urged against the valve member. More particularly, the one lip is more flexible than the most flexible portion of the valve member, so that even as the valve member deflects unevenly about the portions engaged by the one lip, such lip will follow it so as to maintain contact therewith. In a lubricated valve of this type, these radially spaced apart lips define between them the groove into which lubricant is fed in the manner previously described.

The initial clearance between the other lip and the valve member serves several purposes in addition to permitting this flexure of the one lip. Thus, this relatively rigid lip provides a stop to further flexing of the one lip when the load becomes so high as to otherwise flex such one lip beyond its elastic limit. Still further, this clearance provides an outlet for lubricant into the high presure side of the seat when the lubricant pressure becomes excessive and must be relieved.

In the drawings where there is shown, by way of illustration, one embodiment of the invention:

FIG. 1 is a longitudinal sectional view of a ball valve constructed in accordance with the present invention and with the valve member thereof in open position;

FIG. 2 is a similar view of a part of the valve, on a larger scale and with the valve member in closed position;

FIG. 3 is an elevational view of the valve member and sectional view of the valve seats, removed from the valve body of FIG. 1 and showing by broken lines the area of the valve member over which line pressure is effective in its closed position;

FIG. 4A is an enlarged view of the inner end of the upstream seat engaged with the valve member at relatively low line pressure; and FIGS. 4B and 4C are similar views of portions of the seat and valve member at relatively high line pressure.

With reference now to the details of the above-described drawings, the ball valve shown in FIG. 1, and designated in its entirety by reference character 10, includes a valve body 11 having a flowway 12 therethrough and a valve member 13 rotatable within the body for opening and closing the flowway. More particularly, the valve member 13 has an opening 14 through a ball-shaped closure 15 thereof and upper and lower stems 16 and 17, respectively, on such closure to permit it to be rotated between positions in which the opening 14 is aligned with the flowway 12 to open same and in which the opening and solid portions of the closure 15 on each side of the opening are disposed across the flowway to close same.

The valve body 11 includes a central portion 18 having bearings 19 and 20 on the upper and lower sides thereof, respectively, for receiving the valve member stems 16 and 17. As shown in FIG. 1, the stem 16 extends through the bearing 19 to provide an external part for actuating the valve member. The inner surface 21 of this central body portion is shaped spherically and concentrally of the outer surface of ball-shaped closure 15 of valve member 13 to provide a cavity fitting closely thereabout.

The valve body 11 also includes tubular extensions 21 connected by welding 22 to the opening in each opposite end of central body portion 18. These tubular extensions have flanges 23 on their outer ends for connecting the valve in a pipeline or other conduit and annular recesses 24 on their inner ends adjacent the valve member 13 for receiving seats 25 adapted to seal against opposite sides of the valve member in the closed position thereof. As shown in FIG. 1, the openings 26 through the seats are the same diameter as the valve member opening 14, and the openings 14 and 26 are, in turn, of the same diameter as the flowway 12 through the tubular extensions 21 of the valve body, so that the valve is "full opening," as shown in FIG. 1.

As described more fully in Pat. No. 3,157,190, issued to Herbert Allen on Nov. 17, 1964, and assigned to the assignee of the present application, the central portion 18 of the valve body 11 may be split along a plane passing through the axis of the flowway and perpendicular to the axis of rotation of the valve member, and the split parts then assembled over the stems 16 and 17 and welded to one another to capture the valve member. At this time, the seats 25 may be assembled within the recesses 24 of each tubular extension 21, and the extensions and the seats moved into positions for mounting the seats and forming the welds 22 connecting the tubular extensions 21 to the openings in opposite sides of central portion 18 of the valve body. This, of course, also captures the seats against removal from the valve body except upon destruction of the welds 22.

In its preferred form, the valve 10 also includes a means for rotating each seat 25 about its axis in response to operation of the valve so as to distribute wear about the seat. Thus, as shown in FIG. 1, a dog 27 is carried on each upper side of the valve member 13 for engaging with and disengaging from teeth 28 about the periphery of the seat 25 as the valve member is rotated between opened and closed positions. A detailed explanation of the construction and operation of these parts can be found in the aforementioned Patent No. 3,157,190.

As best shown in FIG. 2, each seat 25 includes an annular one-piece metal body 29 having an outer relatively flexible lip 30a and an inner relatively rigid lip 30b on its inner end to define a groove 31 therebetween opposite the valve member 13. As previously mentioned, this groove is adapted to contain a viscous grease to provide a sealing film across the oppositely disposed surface of the valve member. For this and other purposes to be described, the body 29 of the seat has a passageway 32 therein connecting the groove with a passageway 33 in the valve body to which a fitting 34 is connected to permit lubricant to be injected through the passageways and into the groove. Thus, the outer end of the valve body passageway 33 has threads 35 thereabout to receive threads 36 of the fitting, which may be of conventional construction adapted to receive a conventional grease gun.

As can be seen from FIG. 2, the inner end of passageway 33 connects with the recess 24 in the flowway through the valve body, and the outer end of passageway 32 connects with an annular area about the circumference of the seat body intermediate its inner and outer ends. Seal rings 37 and 38 are carried within grooves in the recess 24 of the valve body for sealing engagement with the outer diameter of the seat body on opposite sides of the inner end of passageway 33 and outer end of passageway 32. In this way, lubricant is confined for flow from the passageway 33 into the passageway 32, and thus into the groove 31 on the inner end of the seat body. Although lubricant is effective over this annular area about the seat body to provide a radially inwardly directed force on such body tending to collapse same, lubricant may be relieved when its pressure exceeds the line pressure on the interior of the seat an excessive amount, as will be described hereinafter.

The outer lip 30a of the seat is separated from and made flexible with respect to the main portion of the seat body by means of undercut 39 extending radially outwardly from the groove 31. An annular depression about the lip 30a adjacent its base renders it even more flexible, while at the same time leaving a relatively wide sealing surface at its free end. This sealing surface is lapped to fit the spherical surface of the closure 15 and protrudes from the inner end of the seat body to engage the closure prior to engagement therewith of the inner lip 30b.

The outer lip 30a is initially urged into sealing engagement with the valve member by means of a washer type spring 41 or other resilient means acting between an enlarged portion of the seat recess 24 and the outer side of the enlarged inner end portion of seat body 29. More particularly, the radially outer line contact of the lip 30a is no larger than the outer diameter portion of the seat body with which seal ring 37 is engaged. Thus, upstream line pressure will urge the inner end of the seat toward the valve member.

If there is leakage past the seat, the lubricant system may be put into operation by the introduction of lubricant into the groove 31 in the manner previously described. As is apparent from FIG. 2, the lubricant pressure acts over an outwardly facing area on the seat body to drive its inner end more tightly against the valve member. Thus, the outer diameter portion of the seat body with which seal ring 37 engages is larger than the outer diameter portion thereof with which seal ring 38 engages, so that there is a net annular area facing outwardly on which the lubricant acts to urge the seat body inwardly.

However, when the inner end of the seat body is forced against the valve member, the lubricant pressure also acts over the inwardly facing area on such seat body within the groove 31. As more fully disclosed in the aforementioned pending patent application, Ser. No. 354,962, this groove area is larger than the oppositely facing area between seal rings 37 and 38 so that the force due to lubricant pressure which urges the seat away from the valve member is larger than the force due to lubricant pressure which urges it toward the valve member. As a result, the seat will back away from the valve member to relieve lubricant from the groove through the clearance between the seat 30b and the closure when its pressure becomes excessive. More particularly, these opposed areas may be so designed that the unseating force will overcome the total seating forces when such pressure reaches a predetermined point.

As previously described, the initial clearance between the relatively rigid lip 30b and the outer surface of the valve member is useful in providing further means by which the lubricant may be relieved. Still further, and again as previously described, it provides a limit to the amount of flexing of the relatively flexible lip 30a. Thus, as will be understood from the drawings, as the seat is urged against the closed valve member, at least some portions of the end of the lip 30a will be flexed in a direction toward the main portion of the seat body. The clearance between the relatively rigid lip 30b and the valve member is so designed as to not only facilitate charging of the groove with lubricant and relieving the lubricant in the event of excessive lubricant pressure, but also to limit flexing of the lip 30a to prevent it from exceeding its elastic limit. The exact amount of this clearance, upon initial engagement of the flexible lip 30a with the valve member, will be dependent on a number of factors, all within the design capabilities of persons skilled in this art. A clearance of .012 to .014 inch has been found to not only accomplish the abovementioned purposes, but also substantially contain the lubricant.

Obviously, in most valve designs, it is desirable that the opening 14 through the valve member, and thus the opening 26 through the valve seats 25, be as large as possible relative to the O.D. of the valve member. As this proportion increases, the outer diameter of portions of the area of the closed valve member surface over which line pressure is effective approach the edge of the opening through the valve member. This is illustrated in FIG. 3, wherein the area circumscribed by the outer relatively flexible lip 30a of the seat 25 is shown by broken lines to be adjacent thin hollow portions of the valve member intermediate its upper and lower ends (see the arrows A) and to be adjacent thick, solid portions of the valve member at the upper and lower ends thereof above or below the valve member opening 14 (see the arrows B).

As previously described, under the influence of high pressure acting over the area defined by the broken lines, the closed valve member will deflect more at these thin portions than at the thick portions. Thus, in the event the metal surfaces of the seat engageable with the valve member were rigid, there would be leakage between the seat and valve member along these relatively thin portions of the valve member. In accordance with the present invention, however, and as previously mentioned, the outer lip 30a of the valve seat is more flexible than the most flexible portion of the valve member. Thus, as these thinner portions of the valve member deflect under load, the relatively flexible lip 30a is free to follow them about the sealing surface of the valve member so as to maintain engagement therewith.

This phenomenon is illustrated in FIGS. 4A to 4C. In FIG. 4A, the relatively flexible seat 30a sealably engages the surface of the closed valve member under relatively low line pressure without significant flexure. However, as this line pressure increases so as to urge the seat toward the valve member with greater force, the portions of the relatively flexible lip 30a opposite the thick portions of the valve member will deflect from the broken line position to the solid line position shown in FIG. 4B. As this force is transmited to the valve member to cause the thinner portions thereof to deflect from the broken line position shown in FIG. 4C to the solid line position shown therein, the other portions of the relatively flexible lip 30a will not flex, but instead follow the valve member. Obviously, in the intermediate portions of the valve member and seat, there will be some flexure of both the valve member and lip 30a.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a valve body having a flowway therethrough, a ball-shaped valve member having an opening therethrough, means mounting the valve member within the valve body for rotation between an open position in which the opening is aligned with the flowway and a closed position in which said opening is across the flowway, an annular metal seat body sealably slidable axially within the flowway at one side of the valve member, a pair of radially spaced apart annular metal lips about the inner end of the seat body defining a groove therebetween, and means for feeding lubricant into said groove, one of said lips being relatively flexible and engageable with the valve member prior to the other lip, as the inner end of the seat is urged against said valve member, and said one lip also being more flexible than the most flexible portion of the valve member against which it engages in the closed position of said valve member so that it will conform to the deflection of said valve member.

2. A valve of the character defined in claim 1, wherein the inner portion of the valve seat is undercut to define the relatively flexible lip as an integral portion thereof.

3. A valve of the character defined in claim 2, wherein there is an annular depression in the relatively flexible lip adjacent its base and on the side thereof opposite the undercut.

4. A valve comprising a valve body having a flowway therethrough, a ball-shaped valve member having an opening therethrough, means mounting the valve member within the valve body for rotation between an open position in which the opening is aligned with the flowway and a closed position in which said opening is across the flowway, an annular metal seat body sealably slidable axially within the flowway at one side of the valve member, a pair of radially spaced apart annular metal lips about the inner end of the seat body, one of said lips being engageable with the valve member prior to the other lip as the inner end of the seat is urged against said valve member, said one lip being defined on one side by an undercut in the valve seat and having an annular depression in its other side adjacent its base so as to render it more flexible than the other lip and also more flexible than the most flexible portion of the valve member against which it engages in the closed position of said valve member so that it will conform to the deflection of said valve member.

References Cited

UNITED STATES PATENTS

| | | | |
|---|---|---|---|
| 3,123,078 | 3/1964 | Brooks | 137—246.22 |
| 3,273,855 | 9/1966 | Wells | 251—174 X |
| 3,315,697 | 4/1967 | Oliver | 137—246.22 |

CLARENCE R. GORDON, *Primary Examiner.*